US012748553B2

(12) United States Patent
Chou et al.

(10) Patent No.: US 12,748,553 B2
(45) Date of Patent: Sep. 29, 2026

(54) SYSTEM AND METHOD FOR SEARCHING A BUFFER OF A NON-VOLATILE STORAGE HOST CONTROLLER

(71) Applicant: MEDIATEK INC., Hsin-Chu (TW)

(72) Inventors: Chih-Chieh Chou, Hsinchu City (TW); Chin-Chin Cheng, Hsinchu City (TW); Tzu-Shiun Liu, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 252 days.

(21) Appl. No.: 18/592,554

(22) Filed: Mar. 1, 2024

(65) Prior Publication Data

US 2024/0295990 A1 Sep. 5, 2024

Related U.S. Application Data

(60) Provisional application No. 63/487,627, filed on Mar. 1, 2023.

(51) Int. Cl.
*G06F 3/06* (2006.01)

(52) U.S. Cl.
CPC .......... *G06F 3/0659* (2013.01); *G06F 3/0604* (2013.01); *G06F 3/0656* (2013.01); *G06F 3/0679* (2013.01)

(58) Field of Classification Search
CPC .... G06F 3/0659; G06F 3/0604; G06F 3/0656; G06F 3/0679; G06F 3/061; G06F 9/30145; G06F 9/30185; G06F 9/30189
See application file for complete search history.

(56) References Cited

U.S. PATENT DOCUMENTS 10,599,591 B2 * 3/2020 Lee .......................... G06F 3/061
11,775,470 B2 * 10/2023 Harriman ............ G06F 13/4282
710/105

* cited by examiner

*Primary Examiner* — Idriss N Alrobaye
*Assistant Examiner* — Richard B Franklin
(74) *Attorney, Agent, or Firm* — Winston Hsu

(57) ABSTRACT

A method for searching a buffer of a non-volatile storage host controller is provided. The method includes obtaining a command-based identifier of a command when a system level setting of a first format is enabled; and checking a format information on whether the first format or a second format is used to execute the command according to the identifier. A system for searching a buffer of a non-volatile storage host controller is provided. A host of the system searches a buffer by using the command-based identifier when a system level setting of a first format is enabled and check format information on whether the first format or a second format is used to execute the command according to the identifier.

19 Claims, 3 Drawing Sheets

300

| | 31 | 27 | 26 25 | 24 | 23 | 22 … 16 | 15 … 8 | 7 | 6 … 0 |
|---|---|---|---|---|---|---|---|---|---|
| DW0 | Command Type | R | DD | I | CE | Reserved | Total EHS Length | Crypto Config. Index (CCI) | |
| DW1 | Data Unit Number Lower 32 bits (DUNL) | | | | | | | | |
| DW2 | Last DATA Byte Count (LDBC) | | | | | | Common Data Size (CDS) | Overall Command Status | |
| DW3 | Data Unit Number Upper 32 bits (DUNU) | | | | | | | | |
| DW4 | UTP Command Descriptor Base Address | | | | | | | | Reserved |
| DW5 | UTP Command Descriptor Base Address Upper 32-bits | | | | | | | | |
| DW6 | Response UPIU Offset | | | | | | Response UPIU Length | | |
| DW7 | PRDT Offset | | | | | | PRDT Length | | |

UTP Transfer Request Descriptor

FIG. 3

SYSTEM AND METHOD FOR SEARCHING A BUFFER OF A NON-VOLATILE STORAGE HOST CONTROLLER

CROSS REFERENCE TO RELATED APPLICATIONS

This application claims the benefit of U.S. Provisional Application No. 63/487,627, filed on Mar. 1, 2023. The content of the application is incorporated herein by reference.

BACKGROUND

Universal Flash Storage (UFS) or Non-Volatile Memory Host Controller Interface Specification (NVMHCIS) is a non-volatile storage specification for digital cameras, mobile phones and consumer electronic devices. It was designed to bring higher data transfer speed and increased reliability to flash memory storage, while reducing market confusion and removing the need for different adapters for different types of cards. The standard encompasses both packages permanently attached (embedded) within a device and removable UFS memory cards.

SUMMARY

The following summary is illustrative only and is not intended to be limiting in any way. That is, the following summary is provided to introduce concepts, highlights, benefits and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

Therefore, the main purpose of the present disclosure is to provide a method and a device for saving power to enable the system clock to be turned off adaptively when the device is idle and enable the external devices to still communicate with the device during the period when the system clock is turned off.

In an exemplary embodiment, a method for searching a buffer of a non-volatile storage host controller is provided. The method includes obtaining a command-based identifier of a command when a system level setting of a first format is enabled; and checking a format information on whether the first format or a second format is used to execute the command according to the identifier.

In another exemplary embodiment, a system for searching a buffer of a non-volatile storage is provided. The system includes a host and a non-volatile storage coupled to the host. The host is configured to obtain a command-based identifier of a command when a system level setting of a 2 double word physical region description table (2DW PRDT) format is enabled; and check whether to use the 2DW PRDT format or a 4 double word physical region description table (4DW PRDT) format to execute the command according to the identifier.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a data structure of a UTP transfer request descriptor (UTRD) in an embodiment of the present invention.

DETAILED DESCRIPTION

Universal flash storage (UFS) host controller interface (HCI) is used to provide a universal hardware interface to UFS, making it convenient for the host controller driver to use different host controller implementations that follow HCI specification.

Therefore, the problem of using various hardware interfaces can be reduced, and the software driver can be compatible. A host and a device can communicate through UFS protocol information units (UPIUs).

When the host sends a read command to the device, the device needs to return data to the host, and the device transmits data to the host through DATA IN UPIU. When the host sends a write command to the device, the host needs to write data to the device, and the host transmits data to the device through DATA OUT UPIU. When the UFS host writes data to the device, it considers whether the device can receive the data at this time (because the device may not have enough space to receive the host data at one time). After it sends the write command to the device, the data will not be transmitted to the device immediately but will wait for notification from the device. When the device is ready to receive data, the device informs the host through READY TO TRANSFER UPIU (RTT). When the host receives the RTT, it starts transmitting data according to the RTT information. The RTT includes the amount of data to be transmitted each time, and the host transmits the data according to the RTT. Therefore, the host can only send DATA OUT UPIU after receiving the RTT from the device.

Figure 1:
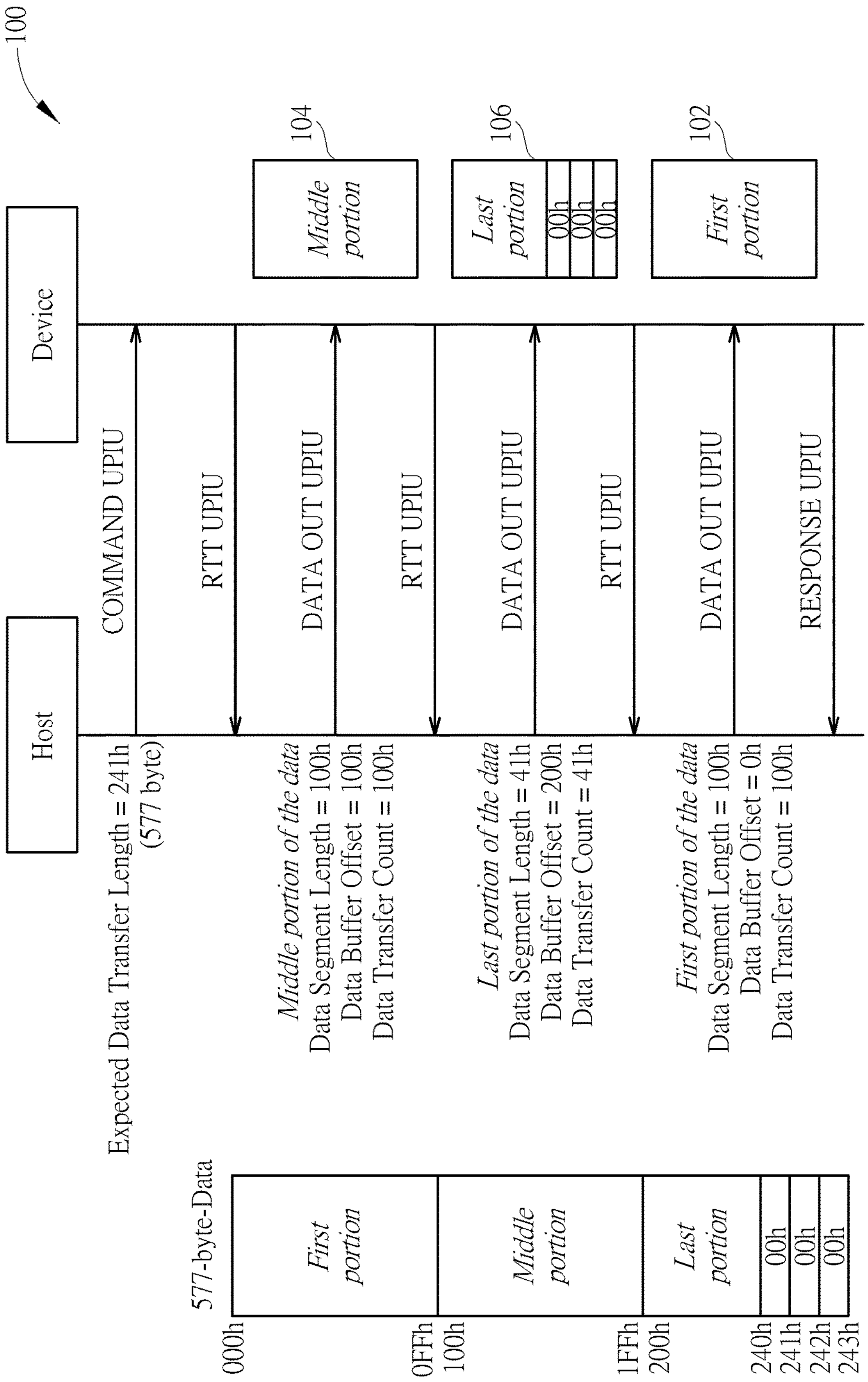
FIG. 1 is a schematic diagram of out of order (OOO) data transfer feature according to an embodiment of the present invention.

FIG. 1 is a schematic diagram of out of order (OOO) data transfer feature 100 according to an embodiment of the present invention. In the embodiment, there are a plurality of data buffers in the host to store the data. Those data buffers are managed as the scatter/gather buffers which refer to a method used for input/output (I/O) operations that allows data to be read from or written to non-contiguous memory regions. That said, the data buffers in the host may be non-contiguous.

Besides, Out of Order (OOO) data transfer feature is defined in UFS specification. The OOO feature allows data blocks to be written to or read from the memory in a different order than a sequential order. For example, the data to be transferred contains a first portion 102, a middle portion 104, and a last portion 106. Without OOO, the data to be transferred would be transmitted according to the order. When OOO is applied, the host may transfer the middle portion 104 in the beginning, followed with the last portion 106 and the first portion 102 as shown in FIG. 1.

To address this issue, UFSHCI defines a 2 double word physical region description table (2DW PRDT) format to ease the implementation of out of order (OOO) feature. In the OOO mode, the host has to find the corresponding physical region description (PRD) buffer by data buffer offset in RTT/DATA IN UPIU. By setting common data size (CDS) to a logic block size(bLogicalBlockSize)*N (n is a positive integer), the host can easily find the corresponding PRD buffer using simple division (shifter) instead of a complicated searching algorithm. The size of CDS is normally 4 KB, but the maximum can be 256 KB Usually, the CDS may be set as 4 KB, 8 KB or 16 KB but the present embodiment is not limited thereto.

However, the 2DW PRDT format is a system-wise setting. Once enabled, all transfer requests have to adopt the 2DW PRDT format, but UFS specification only guarantees data buffer offset alignment to the logic block size (bLogicalBlockSize) for certain commands, such as READ/WRITE commands. In practical usage, data buffer offset alignment is not implemented on some devices.

In an embodiment of the present invention, a 2DW PRDT format identifier on the command basis is provided. The 2DW PRDT format identifier in this embodiment is included in the command and is used for checking whether the 2DW PRDT format is applied when executing the command.

The main function of UFS transport protocol (UTP) layer is to transmit UFS protocol information units (UPIUs). UPIU is the basic exchange data unit between the host and the device.

A physical region description table (PRDT) is used when the host system communicates with the UFS device to perform data transfers. The PRDT essentially describes the physical memory regions in the host that will be involved in the data transfer operation.

Figure 2:
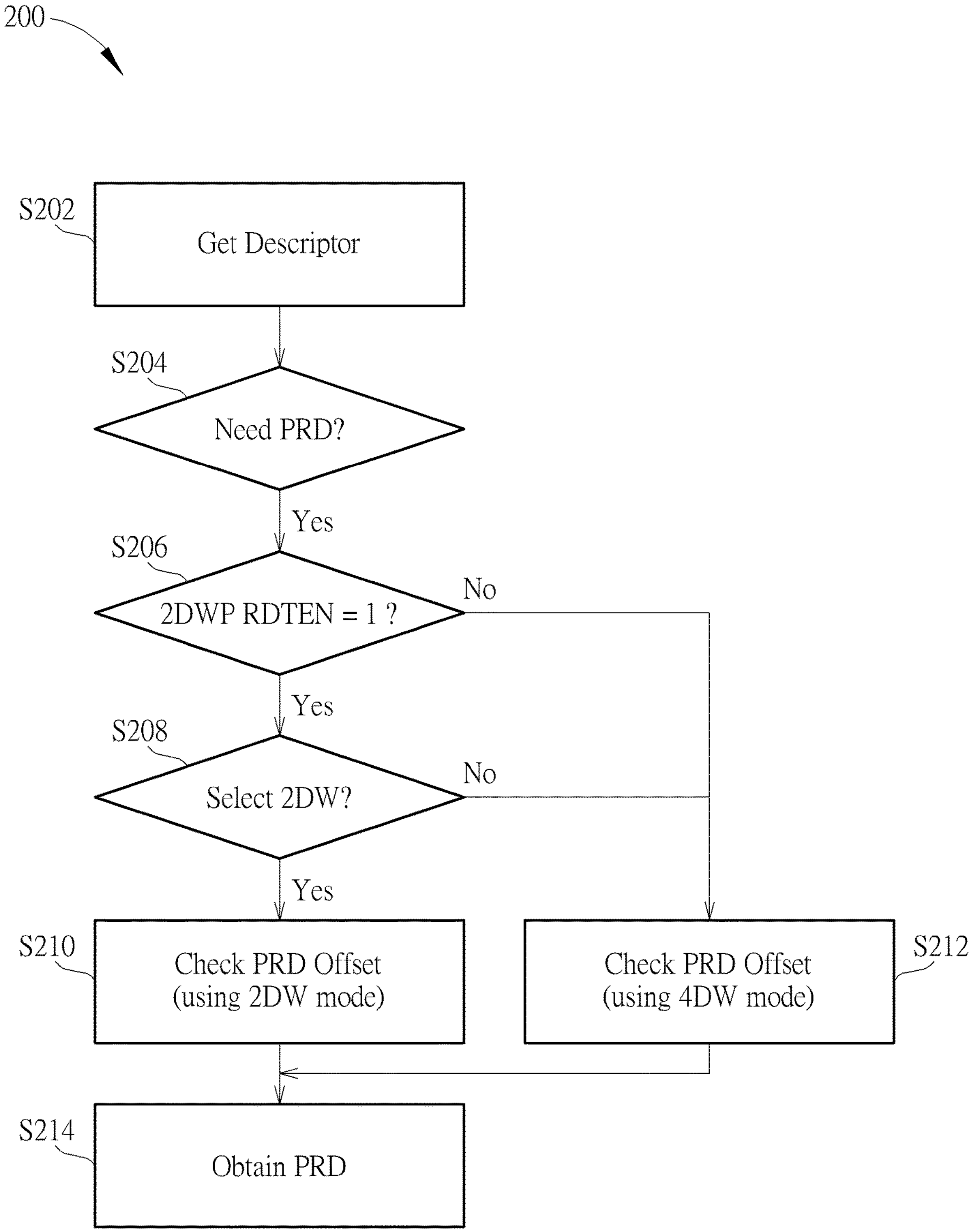
FIG. 2 is a flowchart of a method for searching a buffer of a universal flash storage (UFS) host controller according to an embodiment of the present invention.

FIG. 2 is a flowchart of a method 200 for searching a buffer of a universal flash storage (UFS) host controller according to an embodiment of the present invention. The method 200 includes the following steps:

Step S202: obtain a descriptor of a command;

Step S204: check if the descriptor needs a physical region description (PRD); if so, go to step S206;

Step S206: check if 2DWPRDTEN is 1; if so, go to step S208; else, go to step S212;

Step S208: obtain a command-based identifier of the command to check if 2DW is applied for the command; if so, go to step S210; else, go to step S212;

Step S210: check PRD offset using a 2DW mode;

Step S212: check PRD offset using a 4DW mode;

Step S214: obtain PRD for data transmission.

In step S202, a descriptor is obtained in a command such as ready to transfer (RTT) or DATA IN UFS protocol information unit (UPIU).

In step S204, the descriptor is checked to determine if it needs PRD. If it needs PRD, then go to step S206. In step S206, if the 2DWPRDTEN of the system-wise setting is 1, indicating that the 2DW mode can be used, then go to step S208. If the 2DWPRDTEN of the system-wise setting is 0, indicating that the 4DW mode needs to be used, then go to step S212.

In step S208, whether the 2DW mode is selected or not can be decided according to a command-based identifier of the command. In one embodiment, a reserved bit in UFS transfer protocol (UTP) transfer request descriptor of a command is used as the identifier for determining whether the 2DW mode is applied for this command. If the reserved bit is 1, then the 2DW mode is selected in this command and go to step S210. If the reserved bit is 0, then the 4DW mode is selected in this command and go to step S212.

In another embodiment, a value of a register carried by each command is used as the identifier for determining whether the 2DW mode is applied. If the data in the value of the register is 1, then the 2DW mode is selected in this command and go to step S210. If the value in the register is 0, then the 4DW mode is selected in this command and go to step S212. To be clear, those embodiments mentioned above are merely examples of the present invention. All the hardware-based or software-based identifier can be used for determining whether the 2DW mode is applied for the command shall be covered in the present invention.

In step S210, the PRD offset is checked using the 2DW mode, and the PRD is obtained in step S214. In step S212, the PRD offset is checked using the 4DW mode, and the PRD is obtained in step S214.

A UFS transport protocol (UTP) transfer request list contains a series of data structures named UTP transfer request descriptor (UTRD). UTRD details a command to be executed and related data. The UFS host software initiates a command by inserting a UTRD into this list. In one embodiment, the commands are dispatched based on the order specified by a doorbell register mechanism, where each command corresponds to a slot, and the retrieval order is determined by the doorbell register from the lowest to the highest bit.

In the other embodiment, the MCQ (Multiple Command Queue) architecture operates on the concept of queues, where UTRDs are inserted and retrieved in order.

However, the order in which they are executed may change. At this time, the host controller manages all data transfer operations related to this command on behalf of the processor. Completion of the command will generate an interrupt or update the status field in the UTRD.

FIG. 3 is a data structure 300 of a UTP transfer request descriptor (UTRD) in an embodiment of the present invention. In the command type byte, 0h and 2h-Fh are reserved. The 27th bit in DW0 is reserved and can be used to represent whether to use the 2DW PRDT format or the 4DW PRDT format. If the 27th bit in DW0 is 1b, then the 2DW mode is to be used; if the 27th bit in DW0 is 0b, then the 4DW mode is to be used. To be clear, using the 27th bit of DW0 is just an embodiment of the present invention, but our invention is not limited thereto.

In DW2, the last data byte count (LDBC) is set for the 2DW mode to provide the data bytes for the last PRD The size of LDBC is normally 4B (4 bytes), but the maximum can be 256 KB. Common data size (CDS) is set for the 2DW mode to provide the data bytes for the PRD. The size of CDS is normally 4 KB, but the maximum can be 256 KB. Usually, the CDS may be set as 4 KB, 8 KB or 16 KB but the present embodiment is not limited thereto. Each UTRD defines the size of LDBC and CDS, so that they can be used in the 2DW mode. The size of write/read data transferred is CDS*N+LDBC, thus the host can find the data position in the memory with a simple division and searching algorithm.

The method for searching a buffer of a UFS host controller is command-based by setting a value in the 27th bit (original a reserved bit) of DW0 to be 1b (2DW mode) or 0b (4DW mode). In another embodiment, a register carried with the request command can be set to be 1 for the 2DW mode or 0 for the 4DW mode. The host uses the 2 DW PRDT format with a last data byte count (LDBC) and a common data size (CDS) if the 2 DW PRDT format is to be used. The 2DW PRDT format is applied when the data buffer offset of UPIU is a multiple of a common data size (CDS). If the data buffer offset or the data transfer size is not a multiple of the CDS, then only LDBC is used to transfer data in the 2DW mode.

To be noted, this method for searching a buffer mentioned above can be applied on Non-Volatile Memory Express (NVMe) as well. Using a command-based identifier to determine whether the 2DW mode or the 4DW mode be applied to a command when executing.

In another embodiment, a system for searching a buffer of the non-volatile storage host controller is provided. The system includes a host and a non-volatile storage coupled to the host. The host is configured to execute the methods mentioned above.

In conclusion, the method and the system for searching a buffer of the non-volatile storage host controller are implemented in the embodiments of the present invention. The method can be implemented based on the reserved bit in the UTRD or implemented based on the register carried by the command. Therefore, the method is command-based and can change flexibly between the 2DW mode and the 4DW mode for each command. If the command uses the 2DW mode, the data buffer offset is checked whether it is a multiple of the CDS to provide a solution with LDBC only or a solution with CDS and LDBC.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for searching a buffer of a non-volatile storage host controller comprising:

obtaining a command-based identifier of a command when a system level setting of a first format is enabled; and checking format information on whether the first format or a second format is used to execute the command according to the identifier;

wherein the first format is 2 double word physical region description table (2DW PRDT) format and the second format is 4 double word physical region description table (4DW PRDT) format.

2. The method of claim 1 further comprising:

checking a data buffer offset;

obtaining a physical region description (PRD) according to the data buffer offset and the format information.

3. The method of claim 1, wherein the identifier is a specific part of descriptors of the command for determining whether to use the first format or the second format.

4. The method of claim 3 further comprising if the specific part is 0, using the second format.

5. The method of claim 3 further comprising if the specific part is 1, using the first format.

6. The method of claim 1, further comprising using the first format with a last data byte count (LDBC) and a common data size (CDS) if the first format is to be used, and a data buffer offset is a multiple of a common data size (CDS).

7. The method of claim 6, wherein the common data size (CDS) is N times as a logic block size, wherein n is a positive integer.

8. The method of claim 1, the identifier is a value stored in a register of the command.

9. The method of claim 8 further comprising if the value is 0, using the second format.

10. The method of claim 8 further comprising if the value is 1, using the first format.

11. The method of claim 8, further comprising using the first format with a last data byte count (LDBC) and a common data size (CDS) if the first format is to be used.

12. The method of claim 11, wherein the common data size (CDS) is N times as a logic block size, wherein n is a positive integer.

13. The method of claim 1, wherein the non-volatile storage is UFS or NVMe.

14. A system for searching a buffer of a non-volatile storage, comprising:

a host, and a non-volatile storage coupled to the host, wherein the host configured to obtain a command-based identifier of a command when a system level setting of a 2 double word physical region description table (2DW PRDT) format is enabled; and check whether to use the 2DW PRDT format or a 4 double word physical region description table (4DW PRDT) format to execute the command according to the identifier.

15. The system of claim 14, wherein the host further is further configured to checking a data buffer offset; and obtaining a physical region description (PRD) according to the data buffer offset and the format information.

16. The system of claim 14, wherein the identifier is a specific part of descriptors of the command for determining whether to use the 2DW PRDT format or the 4DW PRDT format.

17. The system of claim 14, wherein the identifier is a value stored in a register of the command.

18. The system of claim 14, wherein the host is further configured to use the first format with a last data byte count (LDBC) and a common data size (CDS) if the first format is to be used.

19. The system of claim 18, wherein the common data size (CDS) is N times as a logic block size, wherein n is a positive integer.

* * * * *